United States Patent
Muratov

(10) Patent No.: US 11,949,249 B2
(45) Date of Patent: Apr. 2, 2024

(54) CALIBRATION OF FOREIGN OBJECT DETECTION DURING CHANGES IN OPERATING CONDITIONS

(71) Applicant: MEDIATEK Singapore Pte. Ltd., Singapore (SG)

(72) Inventor: Vladimir Alexander Muratov, San Jose, CA (US)

(73) Assignee: MEDIATEK Singapore Pte. Ltd., Singapore (SG)

(*) Notice: Subject to any disclaimer, the term of this patent is extended or adjusted under 35 U.S.C. 154(b) by 0 days.

(21) Appl. No.: 17/163,129

(22) Filed: Jan. 29, 2021

(65) Prior Publication Data

US 2021/0257862 A1 Aug. 19, 2021

Related U.S. Application Data

(60) Provisional application No. 62/988,934, filed on Mar. 13, 2020, provisional application No. 62/977,819, filed on Feb. 18, 2020.

(51) Int. Cl.
*H02J 50/60* (2016.01)
*H02J 50/12* (2016.01)
*H02J 50/80* (2016.01)

(52) U.S. Cl.
CPC .............. *H02J 50/60* (2016.02); *H02J 50/12* (2016.02); *H02J 50/80* (2016.02)

(58) Field of Classification Search
CPC .......... H02J 50/60; H02J 50/005; H02J 50/80; H02J 50/12; H02J 7/025
See application file for complete search history.

(56) References Cited

U.S. PATENT DOCUMENTS

| 10,256,674 B2 | 4/2019 | Dimke et al. |
| 10,476,315 B2 | 11/2019 | Dimke et al. |

(Continued)

FOREIGN PATENT DOCUMENTS

| CN | 104885327 A | 9/2015 |
| DE | 10 2017 214 603 A1 | 2/2019 |

(Continued)

OTHER PUBLICATIONS

Extended European Search Report dated Jul. 1, 2021 in connection with European Application No. 21157600.4.

*Primary Examiner* — Rexford N Barnie
*Assistant Examiner* — Joseph N Inge
(74) *Attorney, Agent, or Firm* — Wolf, Greenfield & Sacks, P.C.

(57) ABSTRACT

A wireless power transmitter may receive a request from a wireless power receiver to perform recalibration for a first type of foreign object detection (FOD) in response to the wireless power receiver attempting to change an electromagnetic parameter supplied by the wireless power transmitter. In response to receiving the request, the wireless power transmitter may perform a second type of FOD to produce a FOD result. When the FOD result indicates a foreign object is present or likely present, the wireless power transmitter may discontinue or limit wireless power transfer, and/or communicate the FOD result to the wireless power receiver. When the FOD result indicates a foreign object is not present or likely not present, the wireless power transmitter may communicate the FOD result to the wireless power receiver, perform the recalibration and continue with wireless power transfer.

24 Claims, 7 Drawing Sheets

(56) References Cited

U.S. PATENT DOCUMENTS

| | | | |
|---|---|---|---|
| 2014/0266036 A1* | 9/2014 | Jung | H02J 50/40 |
| | | | 320/108 |
| 2015/0364925 A1 | 12/2015 | Muurinen et al. | |
| 2018/0342907 A1* | 11/2018 | Dimke | B60L 53/122 |
| 2019/0140489 A1* | 5/2019 | Liu | G01R 27/2688 |
| 2019/0181694 A1 | 6/2019 | Roy et al. | |
| 2019/0248251 A1* | 8/2019 | Park | B60L 50/50 |
| 2020/0235612 A1 | 7/2020 | Muratov | |

FOREIGN PATENT DOCUMENTS

| | | |
|---|---|---|
| EP | 3 022 821 B1 | 5/2016 |
| WO | WO 2020/015746 A1 | 1/2020 |

\* cited by examiner

|    | b7 | b6 | b5 | b4 | b3 | b2 | b1 | b0 |
|----|----|----|----|----|----|----|----|----|
| B0 | Reserved | | | | Mode | | | |
| B1 | Min FO Slot Rep | | | Max FO Slot-time Sustainable | | | | |
| B2 | Reserved | | | | FO Presence Probability | | | |

FIG. 4

|    | b7 | b6 | b5 | b4 | b3 | b2 | b1 | b0 |
|----|----|----|----|----|----|----|----|----|
| B0 | Request | | | | | | | |
| B1 | Reserved | | | | FO Presence Probability | | | |

FIG. 6

| hex | dec | b3 | b2 | b1 | b0 | Interpretation | PTX Action Expected |
|-----|-----|----|----|----|----|----------------|---------------------|
| 0 | 0 | 0 | 0 | 0 | 0 | No FO suspected, routine transition to higher power, RPP sent at lowest repetition | No Special Actions |
| 1 | 1 | 0 | 0 | 0 | 1 | | |
| 2 | 2 | 0 | 0 | 1 | 0 | FO is still considered unlikely but RPP has increased variance | PTX may use different averaging scheme |
| 3 | 3 | 0 | 0 | 1 | 1 | | |
| 4 | 4 | 0 | 1 | 0 | 0 | Elevated level of awarness. Friendly Metal Loss might be higher than usual | PTX may review its current FOPP estimate |
| 5 | 5 | 0 | 1 | 0 | 1 | | |
| 6 | 6 | 0 | 1 | 1 | 0 | | FOD Threshold may be Reconsidered |
| 7 | 7 | 0 | 1 | 1 | 1 | Highest uncertainirty, No-FO | |
| 8 | 8 | 1 | 0 | 0 | 0 | Highest uncertenty, Yes-FO | |
| 9 | 9 | 1 | 0 | 0 | 1 | | |
| A | 10 | 1 | 0 | 1 | 0 | PRX is operating at high power, in hot environment, extreme caution | PTX may review its current FOPP estimate toward icrease if slotted Q is low |
| B | 11 | 1 | 0 | 1 | 1 | | |
| C | 12 | 1 | 1 | 0 | 0 | PRX is operating at highest power, in hot environment, extreme caution | Shutdown recommended if Q is low |
| D | 13 | 1 | 1 | 0 | 1 | | |
| E | 14 | 1 | 1 | 1 | 0 | FO presense almost certain | Shutdown requested if Q is low |
| F | 15 | 1 | 1 | 1 | 1 | | |

FIG. 5

| hex | dec | b3 | b2 | b1 | b0 | Recalibration Request | Interpretation | PRX Action Expected |
|---|---|---|---|---|---|---|---|---|
| 0 | 0 | 0 | 0 | 0 | 0 | Recalibration is not requested | No FO suspected | No Special Actions |
| 1 | 1 | 0 | 0 | 0 | 1 | Recalibration is not requested | No FO suspected | No Special Actions |
| 2 | 2 | 0 | 0 | 1 | 0 | Recalibration is not requested | FO is still considered unlikely but FO Loss Estimate has increased variance | Send received power information more often |
| 3 | 3 | 0 | 0 | 1 | 1 | Recalibration is not requested | FO is still considered unlikely but FO Loss Estimate has increased variance | Send received power information more often |
| 4 | 4 | 0 | 1 | 0 | 0 | Recalibration is not requested | Elevated level of awarness | Send received power information even more often |
| 5 | 5 | 0 | 1 | 0 | 1 | Recalibration is not requested | Elevated level of awarness | Send received power information even more often |
| 6 | 6 | 0 | 1 | 1 | 0 | Recalibration is not requested | Highest uncertainirty, No-FO | Reduce power and send power information ASAP |
| 7 | 7 | 0 | 1 | 1 | 1 | Recalibration is not requested | Highest uncertainirty, No-FO | Reduce power and send power information ASAP |
| 8 | 8 | 1 | 0 | 0 | 0 | Recalibration requested | Highest uncertenty, Yes-FO | Recalibration requested |
| 9 | 9 | 1 | 0 | 0 | 1 | Recalibration requested | Highest uncertenty, Yes-FO | Recalibration requested only at HP |
| A | 10 | 1 | 0 | 1 | 0 | Recalibration requested | FO Precence is possible | Recalibration Requested at two points, LP & HP |
| B | 11 | 1 | 0 | 1 | 1 | Recalibration requested | FO Precence is possible | Recalibration requested and supported at least at three points |
| C | 12 | 1 | 1 | 0 | 0 | Recalibration requested | FO presense highly expected | Recalibration requested ans supported at four and more points |
| D | 13 | 1 | 1 | 0 | 1 | Recalibration requested | FO presense highly expected | Shutdown Recommended. Q is low, Ploss is high |
| E | 14 | 1 | 1 | 1 | 0 | Recalibration requested | FO presense almost certain | Reduce Power and recalibrate |
| F | 15 | 1 | 1 | 1 | 1 | Recalibration requested | FO presense almost certain | Shutting down NOW |

FIG. 7

CALIBRATION OF FOREIGN OBJECT DETECTION DURING CHANGES IN OPERATING CONDITIONS

CROSS-REFERENCE TO RELATED APPLICATIONS

This application claims priority to U.S. Provisional Patent Application Ser. No. 62/977,819, titled "CALIBRATION OF LOSS BALANCE BASED FOREIGN OBJECT DETECTION DURING CHANGES IN OPERATING CONDITIONS," filed Feb. 18, 2020 and U.S. Provisional Patent Application Ser. No. 62/988,934, titled "CALIBRATION OF LOSS BALANCE BASED FOREIGN OBJECT DETECTION DURING CHANGES IN OPERATING CONDITIONS," filed Mar. 13, 2020, which are hereby incorporated by reference in their entireties.

BACKGROUND

1. Technical Field

The techniques described herein relate to wireless power delivery, detection of foreign objects, and to transitioning between different levels of power transfer.

2. Discussion of the Related Art

Wireless Power Transfer Systems (WPTS) are gaining increasing popularity as convenient way to deliver power without wires or connectors. WPTS currently under development in the industry can be separated in two major classes: magnetic induction (MI) systems and magnetic resonance (MR) systems. Both types of systems include a wireless power transmitter and a wireless power receiver. Inductive WPTS typically operate in an allocated frequency range of several hundred kilohertz using frequency variation as a power flow control mechanism. MR WPTS typically operate on a single resonant frequency using input voltage regulation to regulate output power. In some applications, MR WPTS operate at a frequency of 6.78 MHz.

SUMMARY

Some aspects relate to method of operating a wireless power transmitter, comprising: receiving a request from a wireless power receiver to perform recalibration for a first type of foreign object detection (FOD) in response to the wireless power receiver attempting to change an electromagnetic parameter supplied by the wireless power transmitter; in response to receiving the request, performing a second type of FOD to produce a FOD result; when the FOD result indicates a foreign object is present or likely present, discontinuing or limiting wireless power transfer, and/or communicating the FOD result to the wireless power receiver; and when the FOD result indicates a foreign object is not present or likely not present, communicating the FOD result to the wireless power receiver, performing the recalibration and continuing with wireless power transfer.

The first type of FOD may measure power loss.

The second type of FOD may measure Q-factor and/or system self-resonant frequency.

The wireless power receiver may send the request in an attempt to change from a low power mode of wireless power transfer to a high power mode of wireless power transfer, or from a high power mode of wireless power transfer to a low power mode of wireless power transfer.

The request may be sent in response to the wireless power receiver attempting to change the electromagnetic parameter by more than a threshold amount.

The electromagnetic parameter may comprise a voltage, current or power level supplied at the wireless power receiver by an electromagnetic field transmitted by the wireless power transmitter.

The threshold may be dynamically changed with a magnitude of a voltage, current or power level supplied at the wireless power receiver by an electromagnetic field transmitted by the wireless power transmitter.

The threshold amount may be at least 10%.

The threshold amount may be at least 50%.

When the FOD result indicates a foreign object is not present or likely not present, the method may further comprise communicating the FOD result to the wireless power receiver.

Some aspects relate to a wireless power transmitter, comprising: circuitry configured to: receive a request from a wireless power receiver to perform recalibration for a first type of foreign object detection (FOD) in response to the wireless power receiver attempting to change an electromagnetic parameter supplied by the wireless power transmitter; in response to receiving the request, perform a second type of FOD to produce a FOD result; when the FOD result indicates a foreign object is present or likely present, discontinue or limit wireless power transfer, and/or communicate the FOD result to the wireless power receiver; and when the FOD result indicates a foreign object is not present or likely not present, perform the recalibration and continue with wireless power transfer.

The first type of FOD may measure power loss.

The second type of FOD may measures Q-factor and/or system self-resonant frequency.

The wireless power receiver may send the request in an attempt to change from a low power mode of wireless power transfer to a high power mode of wireless power transfer, or from a high power mode of wireless power transfer to a low power mode of wireless power transfer.

The request may be sent in response to the wireless power receiver attempting to change the electromagnetic parameter by more than a threshold amount.

The electromagnetic parameter may comprise a voltage, current or power level supplied at the wireless power receiver by an electromagnetic field transmitted by the wireless power transmitter.

The threshold amount may be at least 10%.

The threshold amount may be at least 50%.

Some aspects relate to a method of operating a wireless power receiver, comprising: sending a request to a wireless power transmitter to perform recalibration for a first type of foreign object detection (FOD) while attempting to change an electromagnetic parameter supplied by the wireless power transmitter; receiving a result of a second type of FOD from the wireless power transmitter; when the FOD result indicates a foreign object is present or likely present, changing one or more wireless power transfer parameters, limiting wireless power transfer, or discontinuing wireless power transfer; and when the FOD result indicates a foreign object is not present or likely not present, continuing with wireless power transfer and performing recalibration of the first type of FOD.

The first type of FOD may measure power loss and the second type of FOD may measure Q-factor and/or system self-resonant frequency.

The request may include an indication of a probability of the presence of a foreign object.

The wireless power receiver may be configured to determine the probability of the presence of a foreign object by measuring a temperature variation.

Some aspects relate to a wireless power receiver, comprising: circuitry configured to: send a request to a wireless power transmitter to perform recalibration for a first type of foreign object detection (FOD) while attempting to change an electromagnetic parameter supplied by the wireless power transmitter; receive a result of a second type of FOD from the wireless power transmitter; when the FOD result indicates a foreign object is present or likely present, changing one or more wireless power transfer parameters, limiting wireless power transfer, or discontinuing wireless power transfer; and when the FOD result indicates a foreign object is not present or likely not present, continuing with wireless power transfer and performing recalibration of the first type of FOD.

The first type of FOD may measure power loss and the second type of FOD may measure Q-factor and/or system self-resonant frequency.

The request may include an indication of a probability of the presence of a foreign object.

The wireless power receiver may be configured to determine the probability of the presence of a foreign object by measuring a temperature variation.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 4 shows an example of a request for recalibration sent from the wireless power receiver to the wireless power transmitter, according to some embodiments.

FIG. 5 shows a chart illustrating examples of codes representing various levels of FOPP as transmitted from the wireless power receiver to the wireless power transmitter, and subsequent action by the wireless power transmitter (PTX), according to some embodiments.

FIG. 6 shows an example of a request for recalibration sent from the wireless power transmitter to the wireless power receiver, according to some embodiments.

FIG. 7 shows a chart illustrating examples of codes representing various levels of FOPP as transmitted from the wireless power transmitter to the wireless power receiver (PRX), and subsequent action by the wireless power receiver, according to some embodiments.

DETAILED DESCRIPTION

Figure 1:
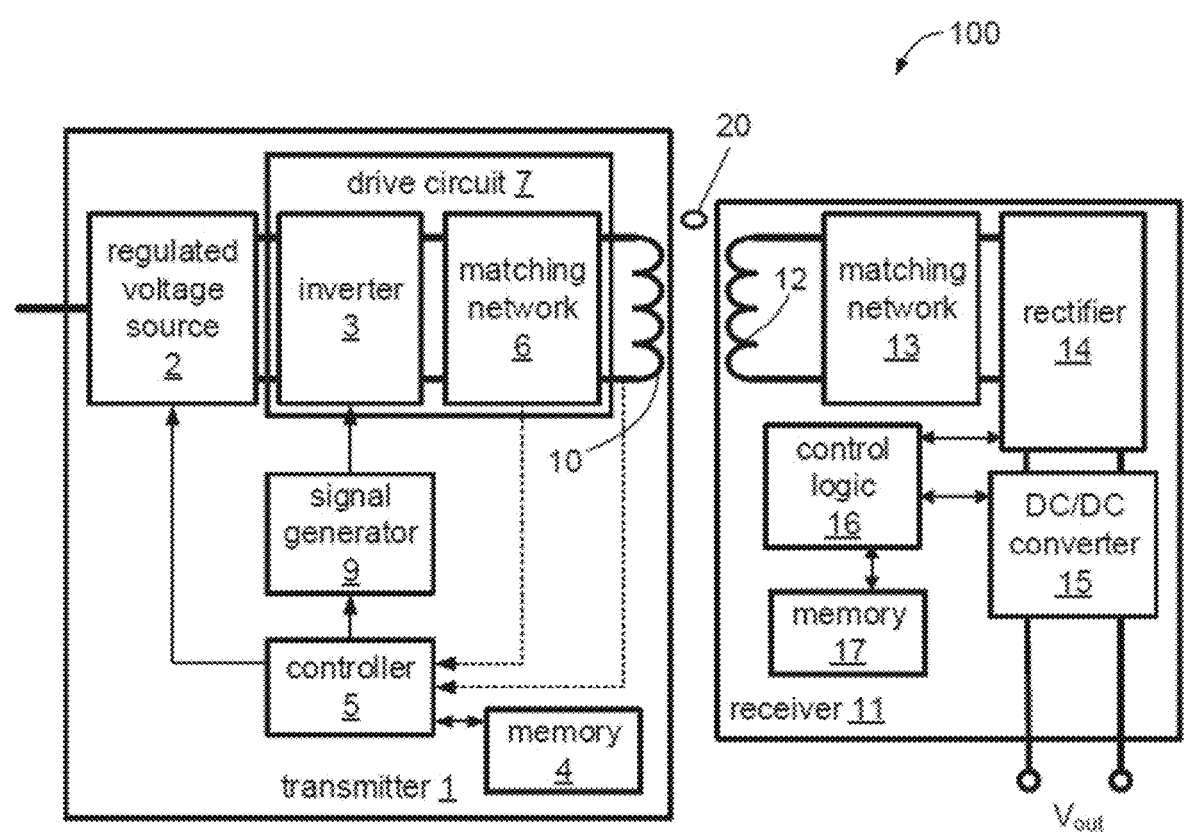
FIG. 1 shows a block diagram of a wireless power transmission system, according to some embodiments.

Wireless power systems can provide a convenient way to provide power from a first device (e.g., wireless power transmitter) to a second device (e.g., a wireless power receiver). In many implementations, the wirelessly provided power can be used to power and/or charge a battery in an electronic device.

Wireless power transfer can be degraded due to the presence of a foreign object in the field produced by the wireless power transmitter. Conductive objects such as metallic objects may absorb power due to the inducement of eddy currents in the conductive object. The presence of such an object can significantly degrade the efficiency of the wireless power transmission. If a metal object is present, efficiency may be reduced substantially (e.g., from 90% to 40%). Further, due to the power absorbed, the temperature of the object may increase significantly, which may be undesirable. Heating may be caused, for example, by a foreign object (such as a paper clip, coin, etc.) that is inadvertently located in the field produced by the wireless power transmitter. Foreign object detection (FOD) techniques have been developed for sensing the presence of a foreign object. It may be desirable to perform foreign object detection prior to initiating wireless power transfer, during power transfer or before transitioning from one power level to another. If a foreign object is detected, wireless power transmission may be halted.

Some wireless power systems may operate in two or more modes of wireless power transfer that may correspond to different levels of wireless power transfer. For example, a wireless power system 100 (such as the one depicted in FIG. 1) having a transmitter 1 and receiver 11 can operate in a low-power mode. An amount of power transferred in a low-power mode can be 5 watts or less, according to some embodiments. In some cases, such a mode may be referred to as a "basic power performance" mode, though other designations may be used. When supported, a wireless power system 100 may operate in one or more high-power modes. For example, a high-power mode may be a mode in which wireless power transfer at power levels over 5 watts can occur. In some cases, a high-power mode may transfer power levels from 5 watts up to 15 watts, or even higher. Such a mode or modes may be referred to as "extended power performance," though other designations may be used. As may be appreciated, higher levels of power loss and foreign object heating can occur with increased power-transfer levels. Accordingly, it can be beneficial to perform foreign object detection (FOD) prior to entering a high-power mode.

Foreign object detection may be performed in a variety of ways, such as by measuring power loss, Q-factor or resonant frequency. A measurement may be performed in the absence of a foreign object to determine a baseline value of the parameter. Such a technique may be considered to be "calibration" or "re-calibration." To perform foreign object detection in practice the same parameter (e.g., power loss, Q-factor or resonant frequency) may be measured, and if the difference between the measured parameter and the parameter measured during calibration (e.g., with no foreign object present) is outside an acceptable range then it may be determined that a foreign object is present or there is a high probability a foreign object is present. In order for the calibration to be effective the FOD measurement may be performed at the same operating power set point as that at which the calibration was performed. Accordingly, when there is a request for a change power level, a FOD recalibration may be performed. However, the inventor has appreciated that if a foreign object is present during recalibration the foreign object may be "calibrated out," which may render subsequent foreign object detection ineffective.

In some embodiments, prior to performing FOD recalibration a second type of FOD may be used to check that a foreign object is not present. For example, if the power loss method is used as the primary method of FOD a different type of FOD may be performed (e.g., using Q-factor or resonant frequency measurements) to verify that no FO is present when recalibrating the power loss FOD technique.

Further details of a wireless power transfer system 100 and foreign object detection are now described briefly before describing a method of performing wireless power transfer.

FIG. 1 shows a block diagram of a wireless power system 100 including a wireless power transmitter 1 and a wireless power receiver 11. The wireless power transmitter 1 has a drive circuit 7 that can include an inverter 3 and matching network 6. The inverter 3 can drive a transmit coil 10 and be impedance matched to the transmit coil through a matching network 6.

According to some embodiments, the wireless power transmitter 1 can further include a regulated voltage source 2 (e.g., a voltage regulator) that provides a regulated DC voltage to the inverter 3. The regulated voltage source 2 produces a regulated DC output voltage in response to control stimulus from the controller 5. In some embodiments, the drive circuit 7 may be a class D or E amplifier that converts the DC voltage at the input of inverter 3 into an AC output voltage to drive the transmit coil 10. Producing an AC output voltage enables wireless power transmission through electromagnetic induction.

The controller 5 may also control a signal generator 9 to drive the inverter 3 with signals of a selected wireless power transmission frequency. As an example, the inverter 3 may be switched at a frequency between 100 and 205 kHz to transmit power to a wireless power receiver designed to receive wireless power according to the Qi specification for low power Qi receivers and 80-300 kHz for medium power Qi receivers. The inverter 3 may be switched at a higher frequency, such as a frequency of greater than 1 MHz, within an ISM band, e.g., 6.765 MHz to 6.795 MHz, to transmit power to a receiver designed to receive wireless power using MR technology. However, these frequencies are provided merely by way of example, as wireless power may be transmitted at a variety of suitable frequencies, in accordance with any suitable specification. Controller 5 may be an analog circuit or a digital circuit. Controller 5 may be programmable, and may command signal generator 9 to produce signals at a desired transmission frequency based on stored program instructions, so that inverter 3 switches at the desired transmission frequency.

Matching network 6 may comprise one or more impedance-matching networks and facilitate wireless power delivery by presenting a suitable impedance to the inverter 3. The matching network(s) may have one or more capacitive or inductive elements or any suitable combination of capacitive and inductive elements. Since the transmit coil 10 may have an inductive impedance, in some embodiments the matching network 6 may include one or more capacitive elements, which, when combined with the impedance(s) of the transmit coil 10, presents an impedance to the output of inverter 3 suitable for driving the transmit coil 10. For example, the matching network may rotate an input impedance of the transmit coil 10 to approximately an output impedance of the inverter 3, so as to reduce power reflection that would otherwise occur from the transmit coil 10. In some embodiments, during wireless power transfer, the resonant frequency of the matching network 6 and transmit coil 10 can be adjusted (e.g., by variable capacitors and/or switching in and out capacitors) and can be set equal to or approximately equal to the switching frequency of the inverter 3.

The transmit coil 10 and receive coil 12 may be realized by any suitable type of conductors. The conductors may be wires, including solid, single-core wire or Litz wire. In some cases, a coil can be formed from patterned conductors, such as patterned conductors of a printed-circuit board or an integrated circuit.

AC current that is driven in the transmit coil 10 can generate an oscillating magnetic field in accordance with Ampere's law. The oscillating magnetic field can induce an AC current in, and voltage across, a nearby receiver coil 12 of the wireless power receiver 11 in accordance with Faraday's law. The AC voltage induced across the receiver coil 12 is provided through a matching network 13 to a rectifier 14 that generates an unregulated DC voltage. Rectifier 14 may be a synchronous rectifier or may be implemented using diodes and one or more capacitors. The unregulated DC voltage can be regulated using a DC/DC converter 15, the output of which may be filtered and provided to a load as output voltage Vout. In some alternate embodiments the DC/DC converter 15 can be replaced by a linear regulator or battery charger, or eliminated altogether.

According to some implementations, a wireless power receiver 11 may include memory 17 and control logic 16. Control logic 16 can comprise application-specific circuitry (such as an application-specific circuit formed of logic gates and buffers, among other circuit components), one or more field-programmable gate arrays, a microcontroller, a microprocessor, or some combination thereof. The memory can include one or both of volatile and non-volatile types of memory. The control logic 16 can be in communication with the memory 17 and may further be in communication with one or both of the rectifier and DC/DC converter or linear regulator or battery charger.

In some embodiments, the wireless power transmitter 1 may have communication circuitry (e.g., within or connect to controller 5) for communicating with wireless power receiver 11. The communication can be through in-band communication or out-of-band communication. Similarly, wireless power receiver 11 may have communication circuitry (e.g., within or connected to control logic 16) for communicating with a wireless power transmitter 1. According to some embodiments, the wireless power receiver 11 may send information to the wireless power transmitter 1 indicating the power demanded at the wireless power receiver 11, or request a change in the power level to be provided by the wireless power transmitter 1. In response, the wireless power transmitter 1 may increase or decrease its power output accordingly. The wireless power transmitter 1 may control the amount of power transmitted by varying the voltage drive level applied to the transmit coil 10, the frequency of the oscillating voltage applied to the transmit coil 10, or both. Any suitable power control techniques may be used.

As shown in FIG. 1, if a conductive foreign object 20 enters the field produced by the transmit coil 10 of the wireless power transmitter 1, the wireless power transmission efficiency may be degraded and/or the conductive foreign object 20 may undergo significant heating. Examples of conductive foreign objects 20 include coins, paperclips, and keys, by way of illustration.

According to some embodiments, a method referred to as "power loss balancing" or "loss balancing" can be used to evaluate whether a foreign object is present, or the likelihood of a foreign object being present. In power loss balancing, power losses associated with the wireless power transmitter 1 and wireless power receiver 11 without a foreign object present are measured during a calibration step. Evaluating the presence of a foreign object may involve measuring the power loss and determining whether it is outside an acceptable range. During power transfer, an amount of power transmitted by the wireless power transmitter may be determined and an amount of power received by the wireless power receiver can be determined (e.g., measured). The amount of power received by the receiver 11 can be communicated to the wireless power transmitter. A difference between amount of power transmitted (based on power applied to transmitter coil, and transmitter losses) and the actual power received (based on power delivered to the load and receiver losses) can be attributed, at least in part, to power loss associated with one or more foreign objects.

In some implementations, if the power loss associated with foreign object(s) exceeds a threshold value, wireless power transfer will be interrupted so that the foreign object 20 can be removed. Some standards, such as the Qi standard, may have several threshold values that depend upon the mode of operation. For example, wireless power transfer may be interrupted if power loss associated with a foreign object exceeds 350 milliwatts in a low-power mode of operation and exceeds 750 milliwatts in a high-power mode of operation. It will be appreciated that other threshold values may be used in the Qi standard or other standards, and the invention is not so limited to only these example values.

In some implementations, foreign object detection can be performed using an alternative type of foreign object detection. For example, foreign object detection may be performed by measuring a quality factor Q associated with the transmit coil 10. For example, the wireless power transmitter 1 can excite a resonance in the transmit coil 10 and then allow the stored energy to decay. The observed rate of decay is dependent upon the Q of the transmit coil and parameters of the circuit in which it exists, and can also be affected by the presence of any foreign objects 20 that can interact with the electromagnetic field produced by the transmit coil 10. Another example of a foreign object detection technique involves measuring the resonant frequency of the wireless power transmitter. A resonant frequency that shifts outside of an allowed range may be indicative of a foreign object. Examples of foreign object detection methods are described in further detail in U.S. patent application Ser. No. 15/957, 704, titled "Detecting Foreign Objects in Wireless Power Transfer Systems," filed Apr. 19, 2018, which application is incorporated herein by reference in its entirety.

Figure 2:
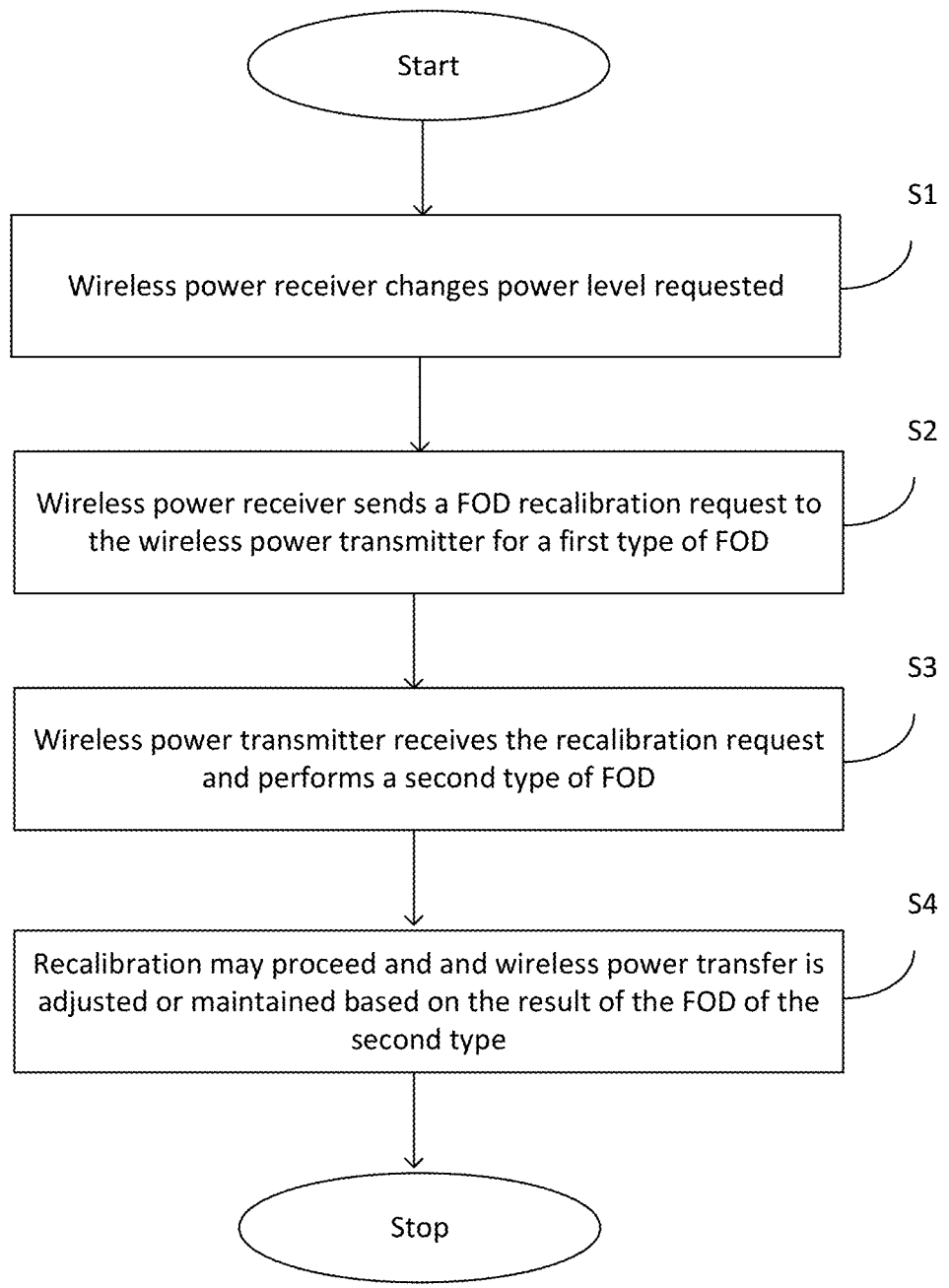
FIG. 2 shows an example of a method of wireless power transfer, according to some embodiments.

FIG. 2 shows an example of a method of wireless power transfer, according to some embodiments. The method may begin at step S1, after wireless power transfer between a wireless power transmitter and a wireless power receiver has commenced. During operation the wireless power receiver may decide to change the level of power requested from the wireless power transmitter. Such a decision may be made by a control logic 16 of the wireless power receiver due to increased load or due to the spatial position of the wireless power receiver relative to the wireless power transmitter (e.g., misalignment between the transmitter and receiver may cause the wireless power receiver to request additional power). However, the wireless power receiver may decide to change the level of power requested from the wireless power transmitter for any of a variety of reasons, and the techniques described herein are not limited in this respect. In some embodiments, the wireless power receiver may request the wireless power transmitter to transition from a low power mode to a high power mode. Alternatively, the wireless power receiver may request the wireless power transmitter to transition from a high power mode to a low power mode.

In step S2, the wireless power receiver may send a FOD recalibration request to the wireless power transmitter. As mentioned above, system parameters may vary at different power levels, such that it may be desirable to recalibrate the FOD technique when the power level is sought to be changed. For example, a wireless power transmitter may be operated in a half-bridge configuration on power levels up to 5 W and operated in a full-bridge configuration when delivering higher power levels (e.g., 10-30 W). As another example, a wireless power receiver may operate at 5 V rectifier output when delivering a load power of 5 W or lower and may operate at a higher voltage (e.g., 10-20V) when delivering higher load power (e.g., 10-30 W). In some embodiments, a recalibration request may be sent in response to an electromagnetic parameter at the wireless power receiver such as voltage, current or power received form the wireless power transmitter being requested to be changed by threshold value, such as at least 10% or at least 50%. Performing FOD recalibration when the system configuration or operating power parameters such as output voltage, current or power (electromagnetic parameter) changes allows achieving a better loss balance and consequently a more precise calculation of losses associated with a foreign object. In some embodiments, the threshold value for requesting recalibration may be variable, and may depend on the magnitude of the electromagnetic parameter. For example, if wireless power transmission is already occurring at a high power level is sought to be increased, the threshold can be set low so to that recalibration occurs frequently. However, if the value of the electromagnetic parameter (e.g., operating power) is low the threshold can be set larger so that recalibration is not performed as frequently. Additionally, before providing a modified power level to the wireless power receiver, an authentication process may be performed between the wireless power transmitter and the wireless power receiver to verify that the wireless power receiver is capable of operating at the requested power level (e.g., to verify the wireless power receiver is rated to handle the higher power level).

The inventor has appreciated that if a foreign object is present in the electromagnetic field produced by the wireless power transmitter during recalibration, but does not exceed the threshold for the selected foreign object detection method, the foreign object may be "calibrated out." That is, the recalibration may improperly recalibrate the wireless power transmitter on the assumption that no foreign object is present, while a foreign object is in fact present. Such an improper recalibration may cause the foreign object detection method to fail to detect foreign objects.

Figure 3:
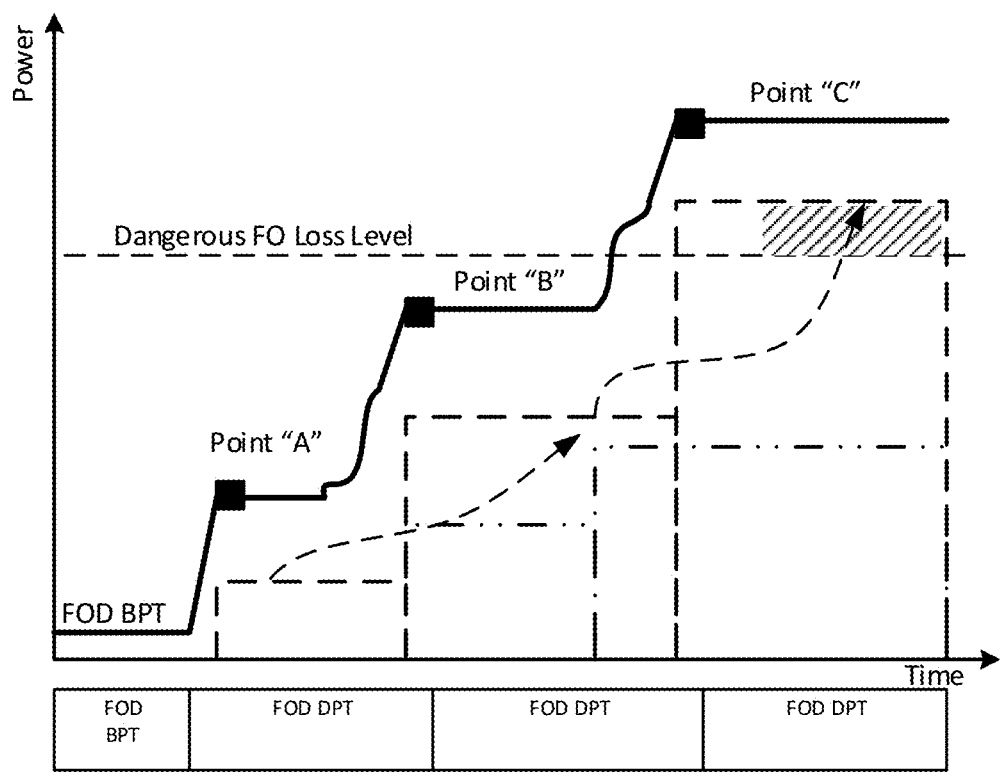
FIG. 3 shows an example of a graph of power transmission vs. time illustrating excessive losses in a foreign object.

FIG. 3 shows an example of a graph of power transmission vs. time illustrating such a problem. Subsequent FOD recalibration at points A, B, and C with subsequently increased transmitted power levels leads to power loss associated with FO being "calibrated out" and ends up reaching excessive levels of power dissipated in the FO.

In some embodiments, such a situation can be avoided by performing a second type of foreign object detection in step S3 before performing the requested recalibration of the first type of foreign object detection. This can help to ensure that a foreign object is not present when the recalibration is performed. The second type of foreign object detection may measure at least one parameter (e.g., power loss, Q-factor or resonant frequency) different from parameter(s) measured by the first type of foreign object detection. For example, if the requested recalibration is for the power loss method of foreign object detection a different (second) type of foreign object detection may be performed, such as foreign object detection that measures Q-factor and/or resonant frequency, prior to the recalibration. If the second type of foreign object detection measures Q-factor and/or resonant frequency, the wireless power transmitter may measure the system Q-factor and/or self-resonant frequency, which are the Q-factor and the resonant frequency of the wireless power transmitter transmit coil in the presence of the wireless power receiver. In some embodiments, the second type of foreign object detection may be performed during a predetermined time interval following a recalibration request.

In step S4, based on the result of the second type of foreign object detection further action may be taken.

For example, if the second type of foreign object detection detects that there is no foreign object or that a foreign object is likely not present, then the wireless power transmitter and the wireless power receiver may proceed with the requested recalibration of the first type of foreign object detection. The transmission of a modified level of power may proceed.

If the second type of foreign object detection detects that a foreign object is present or likely present, then the wireless power transmitter may take one or more further actions to mitigate the effect of the foreign object. For example, in some embodiments the wireless power transmitter may immediately stop wireless power transmission. In some embodiments, the wireless power transmitter may not stop wireless power transmission, and may report the result of the second type of foreign object detection to the wireless power receiver. The wireless power receiver may then take action based on the result of the second type of foreign object detection. For example, in some embodiments the wireless power receiver may continue requesting the original power level, may send the wireless power transmitter a new set of FOD calibration parameters, may reduce its output power, or may instruct the wireless power transmitter to stop wireless power transfer.

Figure 3A:
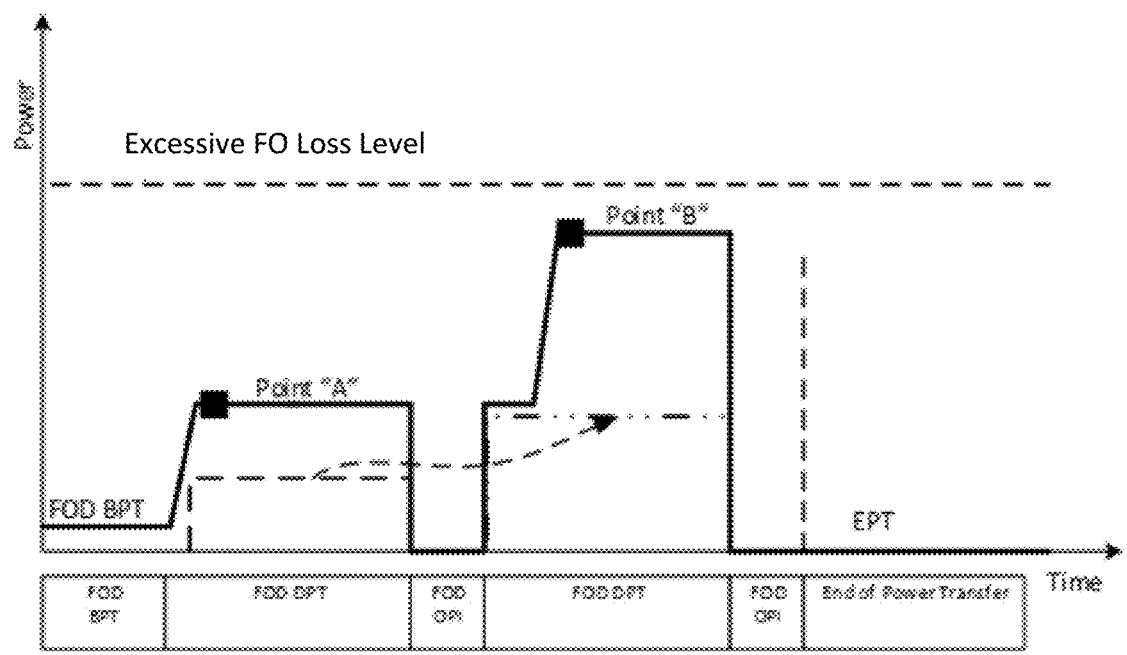
FIGS. 3A and 3B show graphs illustrating wireless power transmission over time.

FIG. 3A shows an example of a graph of power transmission vs. time. A first type of FOD (e.g., power loss balance) may be performed before power transfer (BPT). When no foreign object is detected, power is increased to Point "A." The first type of FOD may be performed during power transfer (DPT), which detects an acceptable level of power loss, as indicated by the dashed line. Then, a request may be received by the wireless power transmitter from the wireless power receiver to increase the level of power transmission to Point "B," which may be a transition from a low power mode to a high power mode. The wireless power transmitter may send a recalibration request for the first type of FOD. A second type of FOD is then performed prior to the recalibration. In this example, power transmission is stopped for the time interval "FOD OPI" (foreign object detection on power interruption). During the time interval FOD OPI a second type of FOD is performed. For example, FOD that involves measuring Q-factor may be performed. In this example, the second type of FOD does not detect a foreign object in the first power interrupt, so the recalibration proceeds and power transfer is allowed to increase to Point "B". If in a subsequent power interrupt the foreign object is detected by performing Q-factor method, the recalibration and power increase to Point "C" are disallowed, effectively ending power transfer based on results of second FOD method.

Figure 3B:
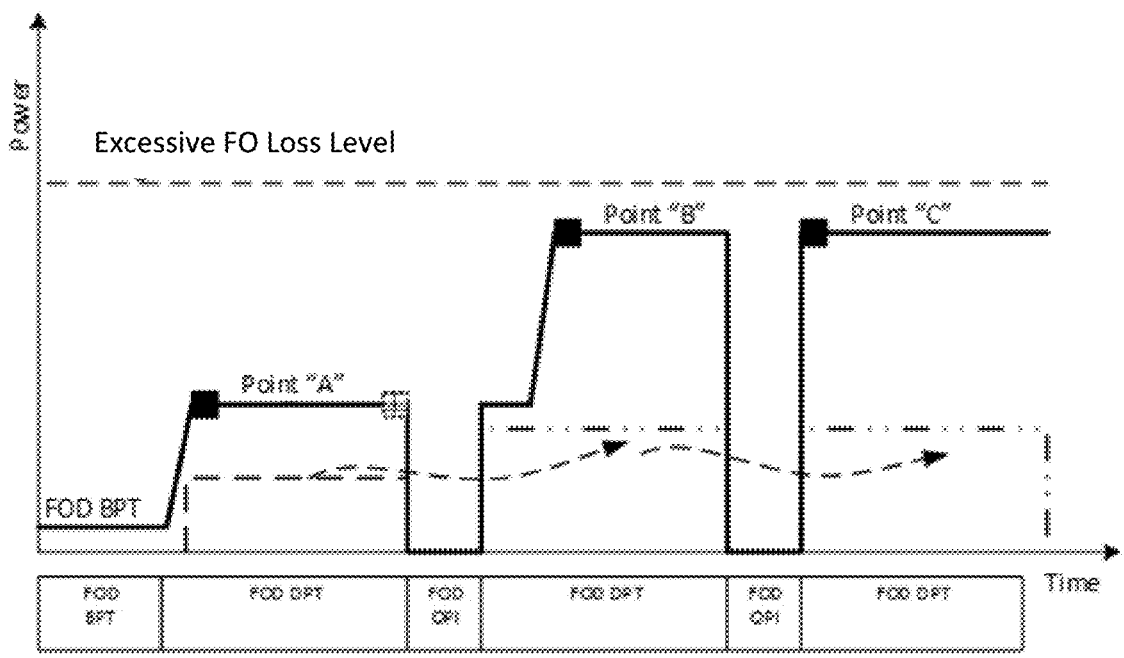

FIG. 3B shows another example where second FOD method results were found satisfactory to consequently increase transmitted power from Point "A" to Point "B" and to Point "C".

Examples of formats of recalibration requests are shown in FIGS. 4 and 5. FIG. 4 shows an example of a request for recalibration sent from the wireless power receiver to the wireless power transmitter (e.g., in step S2), according to some embodiments. The B1 and B2 bytes may be different from previous implementations which included an estimated received power value. The Mode field in the B0 byte may be set to 011. As shown in FIG. 4, the B1 byte may include two fields: the Min FO Slot Rep field and the Max FO Slot-time Sustainable field. The Min FO Slot Rep field represents the minimum FO slot repetition time, which is the minimum time between subsequent FO detection slots. In some embodiments, the minimum FO slot repetition time may be between 0.5 s and 4 s, inclusive. However, the techniques described herein are not limited in this respect, as the FO slot repetition time may have any suitable value. The FO slot is the slot during which regular FOD is performed. The Max FO Slot-time Sustainable field represents the maximum length of the FO slot, which in some embodiments may be between 10 μs and 320 μs, inclusive. However, the techniques described herein are not limited in this respect, as the Max FO Slot-time Sustainable field may have any suitable value. The B2 byte may include an FO presence probability field, which may indicate the probability of a FO being present. In some embodiments, the probability may have a value between zero (indicating zero probability of FO presence) and one (indicating 100% probability of FO presence), which may be expressed in any form, such as a binary form, for example. In some embodiments, the FO presence probability field may have a length of four bits. In some embodiments, the wireless power receiver may measure FO presence probability using different techniques than those used by the wireless power transmitter, such as based on measuring the temperature of the wireless power receiver in one or more locations of the wireless power receiver. For example, uniform heating may be indicative of heading due to environmental factors, such as the wireless power receiver being in sunlight or otherwise in a location with elevated temperature. However, a temperature variation across different locations of the wireless power receiver may be indicative of localized heating due to a foreign object. Temperature sensors at different locations (e.g., different sides) of the wireless power receiver may measure the temperature, and if there is a significant enough difference (e.g., between the temperature on the screen side of a mobile device and the back side of the mobile device), the wireless power receiver may determine an elevated FO Presence Probability. When the wireless power transmitter is informed of an elevated FO Presence Probability it may take various actions such as stopping or limiting wireless power transfer. In some embodiments, the wireless power transmitter may adjust its FOD threshold for either FOD technique when the wireless power receiver informs the wireless power transmitter of an elevated FO Presence Probability (FOPP).

FIG. 5 shows a chart illustrating examples of codes representing various levels of FOPP as transmitted from the wireless power receiver to the wireless power transmitter, and subsequent action by the wireless power transmitter (PTX), according to some embodiments. Even codes may be assigned for optional (recommended) actions, and odd codes may be assigned to mandatory requests, in some embodiments. For example, a binary code of 0000 or 0001 may indicate that no FO is suspected, and a transition to a higher power level may be allowed. The wireless power receiver may periodically send to the wireless power transmitter a message (e.g., a packet) including information indicating the amount of power received by the wireless power transmitter. In response to a low FOPP, as indicated by a binary code of 0000 or 0001, the repetition rate of such a message may be set at its lowest frequency. A binary code of 0011 or 0010 may indicate that FO presence is unlikely, but the information indicating the amount of power received by the wireless transmitter may have an increased variance. The wireless power transmitter may average such power information over time to reduce the effect of noise. In response to a slightly elevated FOPP, as indicated by a binary code of 0011 or 0010, the wireless power transmitter may reduce the time period over which the power information is averaged in order to respond more quickly. Often a wireless power transmitter may only stop wireless power transfer after a number (e.g., 3-5) of out of range FOD measurements. This number may be reduced (e.g., to 2-3) when there is an elevated probability of FO presence, such as when the binary code is 0011 or 0010. A binary code of 0100 or 0101 may indicate an elevated level of awareness of the presence of a FO. The wireless power transmitter may review its current FOPP estimate. A binary code of 0110 or 0111 may indicate no FO, but high uncertainty as to FO presence. For example, the PTX may set its FOPP value to a higher value in response to an elevated FOPP value received from the wireless power receiver. The PTX may reconsider the FOD threshold, and may make the FOD threshold easier to exceed when the PRX indicates an elevated FOPP. A binary code of 1000 or 1001 may indicate a FO is present, but there is high uncertainty as to FO presence. The PTX may reconsider the FOD threshold. A binary code of 1010 or 1011 may indicate the wireless power receiver is operating at high power in a hot environment, and that extreme caution is needed. The wireless power transmitter may increase its FOPP estimate if the Q-factor measured during wireless power transmission is low. A binary code of 1100 or 1101 may indicate the wireless power receiver is operating at the highest power level, in a hot environment, and that extreme caution is needed. The wireless power transmitter may shut down wireless power transmission if the slotted Q is low. A binary code of 1110 or 1111 may indicate the highest level of certainty that a foreign object is present. The wireless power transmitter may shut down wireless power transmission if the slotted Q is low.

In some embodiments, the wireless power transmitter may send a request for recalibration to the wireless power receiver. FIG. 6 shows an example of a request for recalibration sent from the wireless power transmitter to the wireless power receiver, according to some embodiments. Byte B0 may include the request for recalibration. Byte B1 may include the FO presence probability, which may be in the same format as that discussed above with respect to FIG. 4. The FO presence probability may be based on FOD such as using the techniques described herein. Based on the FO Presence Probability the wireless power receiver may take various actions, one of which may include sending the request for recalibration to the wireless power transmitter (e.g., in step S2).

FIG. 7 shows a chart illustrating examples of codes representing various levels of FOPP as transmitted from the wireless power transmitter to the wireless power receiver (PRX), and subsequent action by the wireless power receiver, according to some embodiments. Some FOPP codes may be used for requests that do not involve recalibration, while others may be used as request for recalibration. Even codes may be assigned for optional (recommended) actions, and odd codes may be assigned to mandatory requests, in some embodiments. A binary code of 0000 or 0001 may indicate that no FO is suspected. A binary code of 0010 or 0011 may indicate that FO presence is considered unlikely, but the FO loss estimate has increased variance (e.g., as evaluated over a plurality of measurements). In response, the wireless power receiver may more frequently send information to the wireless power transmitter regarding the amount of power received. A binary code of 0100 or 0101 may indicate an elevated level of awareness of FO presence, and may cause the wireless power receiver to send information regarding the amount of power received even more often than in the case of lower levels of FOPP. A binary code of 0110 or 0111 may indicate that no FO is present, but high uncertainty as to FO presence. The wireless power receiver may reduce the power level requested and send information regarding the amount of power received as soon as possible. A binary code of 1000 or 1001 may indicate that a FO is present, but high uncertainty exists as to FO presence. In response, for 1000 the wireless power receiver may request recalibration. For 1001, recalibration may be requested at a high power point. For 1010, it is indicated that FO presence is possible, and recalibration is requested at both a low power point and a higher power point. For 1011, it is indicated that FO presence is possible, and recalibration is requested for at least three power points. For 1100 it is indicated that FO presence is highly likely, and recalibration is requested for at least four power points. For 1101, it is indicated that FO presence is highly likely, and shutdown is recommended. For 1110 it is indicated that FO presence is almost certain, and it is required to reduce power and perform recalibration. For 1111, it is indicated that shutdown of wireless power transfer is now occurring.

As discussed above, a wireless power transmitter or receiver, respectively may be controlled using controller 5 or control logic 16, which may be implemented by any suitable type of circuitry. For example, the controller 5 or control logic 16 may be implemented using hardware or a combination of hardware and software. When implemented using software, suitable software code can be executed on any suitable processor (e.g., a microprocessor) or collection of processors. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments described herein comprises at least one computer-readable storage medium (e.g., RAM, ROM, EEPROM, flash memory or other memory technology, or other tangible, non-transitory computer-readable storage medium) encoded with a computer program (i.e., a plurality of executable instructions) that, when executed on one or more processors, performs the above-discussed functions of one or more embodiments. In addition, it should be appreciated that the reference to a computer program which, when executed, performs any of the above-discussed functions, is not limited to an application program running on a host computer. Rather, the terms computer program and software are used herein in a generic sense to reference any type of computer code (e.g., application software, firmware, microcode, or any other form of computer instruction) that can be employed to program one or more processors to implement aspects of the techniques discussed herein.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a wireless power transmitter, comprising:
    receiving a request from a wireless power receiver to perform recalibration for a first type of foreign object detection (FOD) in response to the wireless power receiver attempting to change an electromagnetic parameter supplied by the wireless power transmitter;
    in response to receiving the request, performing a second type of FOD to produce a FOD result;
    performing the recalibration for the first type of FOD and continuing wireless power transfer conditioned on the FOD result produced by the second type of FOD indicating that a foreign object is not present or likely not present; and
    in response to the FOD result indicating that the foreign object is present or likely present, performing one or more of discontinuing wireless power transfer, limiting wireless power transfer, or communicating the FOD result to the wireless power receiver;
    wherein the wireless power receiver sends the request in an attempt to change from a low power mode of wireless power transfer to a high power mode of wireless power transfer, or from a high power mode of wireless power transfer to a low power mode of wireless power transfer,
    wherein the first type of FOD measures a first electrical parameter of an electromagnetic coupling between the wireless power transmitter and the wireless power receiver, the second type of FOD measures a second electrical parameter of the electromagnetic coupling between the wireless power transmitter and the wireless power receiver, and the first electrical parameter is different from the second electrical parameter.

2. The method of claim 1, wherein the first electrical parameter comprises power loss.

3. The method of claim 2, wherein the second electrical parameter comprises Q-factor, system self-resonant frequency, or both Q-factor and system self-resonant frequency.

4. The method of claim 1, wherein the request is sent in response to the wireless power receiver attempting to change the electromagnetic parameter by more than a threshold amount.

5. The method of claim 4, wherein the electromagnetic parameter comprises a voltage, current or power level supplied at the wireless power receiver by an electromagnetic field transmitted by the wireless power transmitter.

6. The method of claim 4, wherein the threshold amount is dynamically changed with a magnitude of a voltage, current or power level supplied at the wireless power receiver by an electromagnetic field transmitted by the wireless power transmitter.

7. The method of claim 4, wherein the threshold amount is at least 10%.

8. The method of claim 4, wherein the threshold amount is at least 50%.

9. The method of claim 1, wherein when the FOD result indicates a foreign object is not present or likely not present, the method further comprises communicating the FOD result to the wireless power receiver.

10. A wireless power transmitter, comprising:
    circuitry configured to:
    receive a request from a wireless power receiver to perform recalibration for a first type of foreign object detection (FOD) in response to the wireless power receiver attempting to change an electromagnetic parameter supplied by the wireless power transmitter;
    in response to receiving the request, perform a second type of FOD to produce a FOD result;
    perform the recalibration for the first type of FOD and continue with wireless power transfer conditioned on the FOD result produced by the second type of FOD indicating that a foreign object is not present or likely not present; and
    in response to the FOD result indicating that the foreign object is present or likely present, performing one or more of discontinuing wireless power transfer, limiting wireless power transfer, or communicating the FOD result to the wireless power receiver;
    wherein the wireless power receiver sends the request in an attempt to change from a low power mode of wireless power transfer to a high power mode of wireless power transfer, or from a high power mode of wireless power transfer to a low power mode of wireless power transfer,
    wherein the first type of FOD measures a first electrical parameter of an electromagnetic coupling between the wireless power transmitter and the wireless power receiver, the second type of FOD measures a second electrical parameter of the electromagnetic coupling between the wireless power transmitter and the wireless power receiver, and the first electrical parameter is different from the second electrical parameter.

11. The wireless power transmitter of claim 10, wherein the first electrical parameter comprises power loss.

12. The wireless power transmitter of claim 11, wherein the second electrical parameter comprises Q-factor, system self-resonant frequency, or both Q-factor and system self-resonant frequency.

13. The wireless power transmitter of claim 10, wherein the request is sent in response to the wireless power receiver attempting to change the electromagnetic parameter by more than a threshold amount.

14. The wireless power transmitter of claim 13, wherein the electromagnetic parameter comprises a voltage, current or power level supplied at the wireless power receiver by an electromagnetic field transmitted by the wireless power transmitter.

15. The wireless power transmitter of claim 13, wherein the threshold amount is at least 10%.

16. The wireless power transmitter of claim 13, wherein the threshold amount is at least 50%.

17. A method of operating a wireless power receiver, comprising:
   sending a request to a wireless power transmitter to perform recalibration for a first type of foreign object detection (FOD) while attempting to change an electromagnetic parameter supplied by the wireless power transmitter;
   receiving a FOD result of a second type of FOD from the wireless power transmitter;
   continuing with wireless power transfer and performing recalibration of the first type of FOD conditioned on the FOD result indicating that a foreign object is not present or likely not present; and
   when the FOD result indicates the foreign object is present or likely present, changing one or more wireless power transfer parameters, limiting wireless power transfer, or discontinuing wireless power transfer;
   wherein the wireless power receiver sends the request in an attempt to change from a low power mode of wireless power transfer to a high power mode of wireless power transfer, or from a high power mode of wireless power transfer to a low power mode of wireless power transfer,
   wherein the first type of FOD measures a first electrical parameter of an electromagnetic coupling between the wireless power transmitter and the wireless power receiver, the second type of FOD measures a second electrical parameter of the electromagnetic coupling between the wireless power transmitter and the wireless power receiver, and the first electrical parameter is different from the second electrical parameter.

18. The method of claim 17, wherein the first electrical parameter comprises power loss and the second electrical parameter comprises Q-factor, system self-resonant frequency, or both Q-factor and system self-resonant frequency.

19. The method of claim 17, wherein the request includes an indication of a probability of a presence of a foreign object.

20. The method of claim 19, wherein the wireless power receiver is configured to determine a probability of the presence of a foreign object by measuring a temperature variation.

21. A wireless power receiver, comprising:
   circuitry configured to:
   send a request to a wireless power transmitter to perform recalibration for a first type of foreign object detection (FOD) while attempting to change an electromagnetic parameter supplied by the wireless power transmitter;
   receive a FOD result of a second type of FOD from the wireless power transmitter;
   continue with wireless power transfer and performing recalibration of the first type of FOD conditioned on the FOD result indicating that a foreign object is not present or likely not present; and
   when the FOD result indicates the foreign object is present or likely present, changing one or more wireless power transfer parameters, limiting wireless power transfer, or discontinuing wireless power transfer;
   wherein the wireless power receiver is configured to send the request in an attempt to change from a low power mode of wireless power transfer to a high power mode of wireless power transfer, or from a high power mode of wireless power transfer to a low power mode of wireless power transfer,
   wherein the first type of FOD measures a first electrical parameter of an electromagnetic coupling between the wireless power transmitter and the wireless power receiver, the second type of FOD measures a second electrical parameter of the electromagnetic coupling between the wireless power transmitter and the wireless power receiver, and the first electrical parameter is different from the second electrical parameter.

22. The wireless power receiver of claim 21, wherein the first electrical parameter comprises power loss and the second electrical parameter comprises Q-factor, system self-resonant frequency, or both Q-factor and system self-resonant frequency.

23. The wireless power receiver of claim 21, wherein the request includes an indication of a probability of a presence of a foreign object.

24. The wireless power receiver of claim 21, wherein the wireless power receiver is configured to determine a probability of a presence of a foreign object by measuring a temperature variation.

\* \* \* \* \*